US009967825B2

United States Patent
Hunt-Schroeder et al.

(10) Patent No.: US 9,967,825 B2
(45) Date of Patent: May 8, 2018

(54) ENVIRONMENTALLY AWARE MOBILE COMPUTING DEVICES

(71) Applicant: GLOBALFOUNDRIES INC., Grand Cayman (KY)

(72) Inventors: Eric D. Hunt-Schroeder, South Burlington, VT (US); Igor Arsovski, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days. days.

(21) Appl. No.: 15/001,763

(22) Filed: Jan. 20, 2016

(65) Prior Publication Data

US 2017/0208544 A1    Jul. 20, 2017

(51) Int. Cl.
*H04B 1/38* (2015.01)
*H04W 52/02* (2009.01)

(52) U.S. Cl.
CPC ..... *H04W 52/028* (2013.01); *H04W 52/0251* (2013.01); *H04W 52/0277* (2013.01); *H04B 1/38* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/26* (2018.01)

(58) Field of Classification Search
CPC ........... H04W 52/028; H04W 52/0277; H04W 52/0274; H04W 52/0251; Y02D 70/00; Y02D 70/26; Y02D 70/142; Y02D 70/144; Y02D 70/164; Y02D 70/166; H04B 1/38
USPC .............................................. 455/574, 456.1
See application file for complete search history.

(56) References Cited

U.S. PATENT DOCUMENTS

| 5,193,216 | A | * | 3/1993 | Davis | H04M 1/72516 340/539.21 |
|---|---|---|---|---|---|
| 6,456,695 | B2 | * | 9/2002 | Lee | G08B 25/08 379/37 |
| 8,238,980 | B1 | * | 8/2012 | Shusterman | H04W 52/0251 455/432.1 |
| 2003/0197597 | A1 | * | 10/2003 | Bahl | G06F 1/3203 340/7.58 |
| 2004/0192347 | A1 | * | 9/2004 | Leizerovich | G01S 19/34 455/456.1 |
| 2004/0214616 | A1 | * | 10/2004 | Malcolm | H04W 52/0241 455/574 |

(Continued)

FOREIGN PATENT DOCUMENTS

| CN | 103188382 | 7/2013 |
|---|---|---|
| EP | 2544471 | 1/2013 |

*Primary Examiner* — Mong-Thuy Tran
(74) *Attorney, Agent, or Firm* — David Cain; Andrew M. Calderon; Roberts Mlotkowski Safran Cole & Calderon, P.C.

(57) ABSTRACT

The present disclosure relates to mobile computing devices and, more particularly, to environmentally aware mobile computing devices and methods of use. The method is implemented in a computer infrastructure which has computer executable code tangibly embodied on a computer readable storage medium having programming instructions operable to: place a mobile computing device into a power savings mode when a environmental condition is below a sensor threshold value for a predetermined time period; and place the mobile computing device into a powered up state when the environmental condition exceeds the sensor threshold value.

14 Claims, 6 Drawing Sheets

(56) References Cited

U.S. PATENT DOCUMENTS

| | | | |
|---|---|---|---|
| 2005/0101314 A1* | 5/2005 | Levi | H04L 63/0861 |
| | | | 455/423 |
| 2005/0164633 A1* | 7/2005 | Linjama | H04B 1/1615 |
| | | | 455/41.2 |
| 2005/0212759 A1* | 9/2005 | Marvit | G06F 1/1613 |
| | | | 345/156 |
| 2007/0051872 A1* | 3/2007 | Goldberg | G06Q 10/087 |
| | | | 250/208.1 |
| 2008/0240006 A1* | 10/2008 | Tseng | H04W 52/0225 |
| | | | 370/310 |
| 2009/0259865 A1* | 10/2009 | Sheynblat | G06F 1/3203 |
| | | | 713/323 |
| 2010/0067434 A1* | 3/2010 | Siu | H04W 48/18 |
| | | | 370/328 |
| 2010/0235667 A1* | 9/2010 | Mucignat | G06F 1/3203 |
| | | | 713/323 |
| 2011/0009155 A1* | 1/2011 | Choumaru | H04W 52/028 |
| | | | 455/522 |
| 2014/0051379 A1* | 2/2014 | Ganesh | H04W 4/22 |
| | | | 455/404.1 |
| 2014/0120990 A1* | 5/2014 | Parco | H04W 52/028 |
| | | | 455/574 |
| 2014/0171053 A1* | 6/2014 | Stephens | H04W 52/0251 |
| | | | 455/418 |
| 2014/0225660 A1* | 8/2014 | Cheng | G06F 1/1694 |
| | | | 327/509 |
| 2015/0140934 A1* | 5/2015 | Abdurrahman | H04W 76/023 |
| | | | 455/41.2 |

* cited by examiner

US 9,967,825 B2

ENVIRONMENTALLY AWARE MOBILE COMPUTING DEVICES

FIELD OF THE INVENTION

The present disclosure relates to mobile computing devices and, more particularly, to environmentally aware mobile computing devices and methods of use.

BACKGROUND

Mobile computing devices have limited battery life which forces some users to be frugal with how they use their device throughout the day. Often, it is not feasible for the user to carry a charger for their mobile computing device nor is it feasible for the user to have to manually enable power savings options throughout the day.

Typical mobile computing devices last one full day before requiring a charge; however, battery life may be impaired further when the mobile computing device is used in areas without service, e.g., where the mobile computing device is constantly searching for service. By way of example, office settings provide an environment where throughout the day users are positioned at their desk, perhaps, without mobile computing device service (e.g., 3G, 4G, WiFi). This places a mobile computing device in a constant "searching for signal" mode which causes significant power drain on the mobile computing device, drastically reducing battery life. This power drain can be alleviated by manual input such as powering down the device or enabling airplane mode through the device's many settings. This manual input, though, is very cumbersome to the user.

SUMMARY

In an aspect of the disclosure, a method implemented in a computer infrastructure has computer executable code tangibly embodied on a computer readable storage medium having programming instructions operable to: place a mobile computing device into a power savings mode when an environmental condition is below a sensor threshold value for a predetermined time period; and place the mobile computing device into a powered up state when the environmental condition exceeds the sensor threshold value.

In an aspect of the disclosure, a computer program product comprises a computer readable storage medium having program instructions embodied therewith, the program instructions being executable by a mobile computing device to cause the mobile computing device to control whether a specific antenna remains in a fully powered state or enters a reduced power state comprises: monitoring one or more sensors of the mobile computing device to determine that any of the sensors have exceeded their pre-set thresholds; and placing the mobile computing device into a power savings mode when the one or more sensors remain below their pre-set thresholds.

In an aspect of the disclosure, a system comprises: a CPU, a computer readable memory and a computer readable storage medium; program instructions to define a duration of signal search once an antenna of a mobile computing device is brought to a fully powered state while searching for the signal; program instructions to prevent the antenna of the mobile computing device from entering a reduced power state during a short duration signal-interruption; and program instructions to allow the mobile computing device to adjust to a new environment before making a decision to move the antenna into a reduced power state. The program instructions are stored on the computer readable storage medium for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to mobile computing devices and, more particularly, to environmentally aware mobile computing devices. More specifically, the present disclosure provides environmentally aware mobile computing devices in which sensor data or other activity of the mobile computing device, already available on the mobile computing device, can be used to make decisions relating to power saving modes. For example, the mobile computing device can suspend or delay a "searching for signal" mode after a predetermined time period of inactivity as sensed by one or more sensors of the mobile computing device (and as noted by the sensor data) or other inactivity of the mobile computing device, thereby forcing one or more antennas of the mobile computing device into a low power state. Advantageously, in this way, the present disclosure provides a simple and novel way of vastly improving mobile power management without the need for additional sensors or added battery size.

By way of more specific example, the present disclosure can monitor the activity of one or more sensors or other functions on the mobile computing device and, when it is determined from the sensors or other functions of the mobile computing device that the mobile computing device is not in use for a predetermined period of time, the mobile computing device can be placed in a power saving mode, e.g., "searching for signal" mode can be deactivated or turned off. In this way, by noting that the mobile computing device is not in use for a certain amount of time, it is now possible to place the mobile computing device in a power saving mode, e.g., deactivating the "searching for signal" mode, without the need for monitoring battery life. In embodiments, after a predetermined period of time of inactivity, or intermittently, or after a predetermined amount of time after some activity of the mobile computing device has been sensed, the power saving mode can be disabled, e.g., "searching for signal" mode can be activated, to continue to searching for services. In embodiments, the sensors can include, for example, accelerometers, gyroscopes, or temperature sensors, amongst others. The other functions that can be monitored include activity of, e.g., the touch screen, keyboard, mobile computing device buttons, clocks, antenna (e.g., GPS, WiFi, NFC, Bluetooth, etc) or other device activity.

Figure 1:
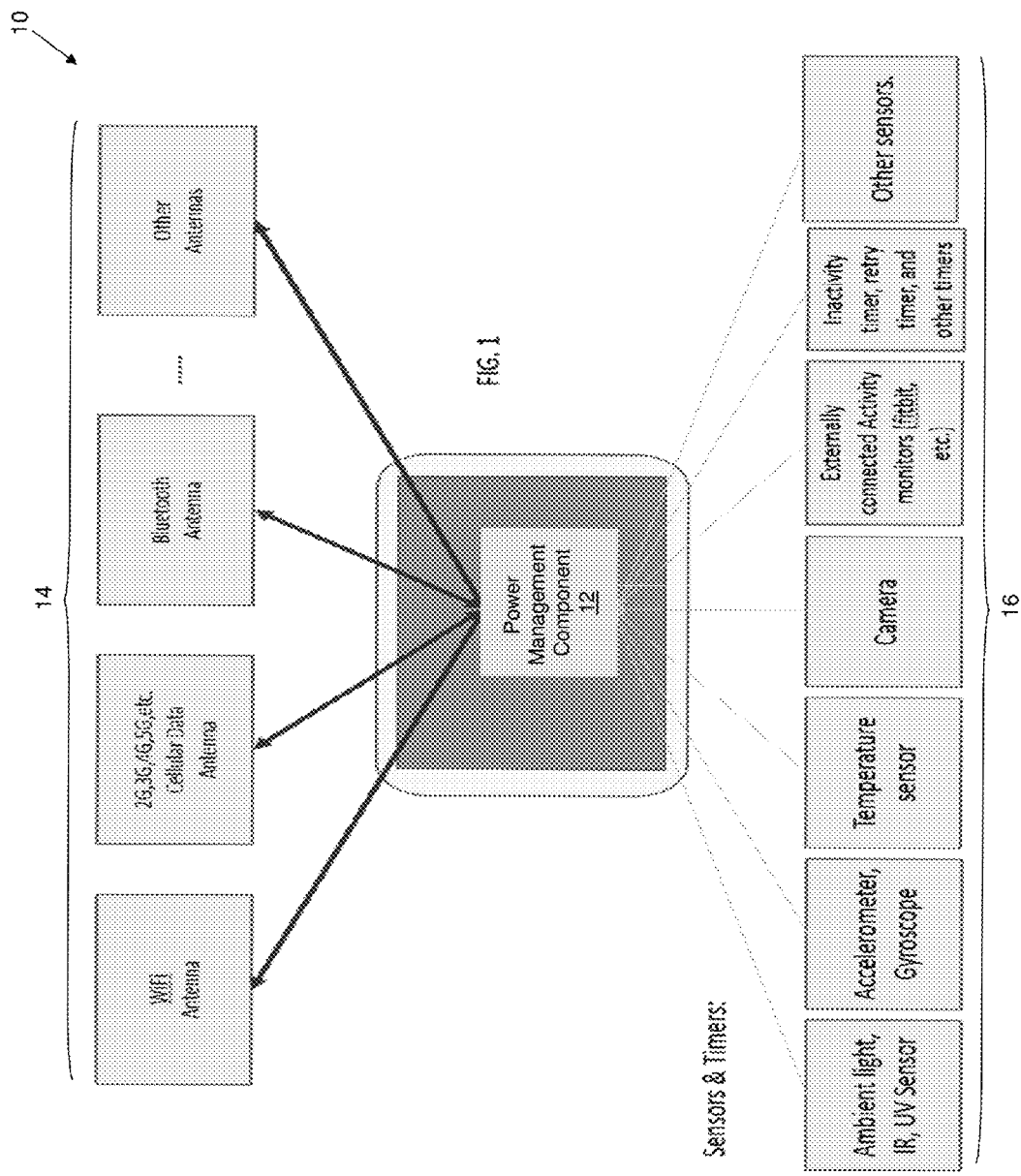
FIG. 1 shows a schematic overview of a mobile computing device implementing processes in accordance with aspects of the present disclosure.

FIG. 1 shows an exemplary environment implementing processes in accordance with aspects of the present disclosure. In particular, the exemplary environment 10 can be a mobile computing device 10 which implements the processes described herein, e.g., automatically places the mobile computing device in a power saving mode. In embodiments, the mobile computing device 10 can include, e.g., a tablet, smartphone or portable digital assistant (PDA); although other mobile computing devices are also contemplated herein such as smart watches, fitness trackers, GPS, etc. In embodiments, the mobile computing device 10, while performing the processes described herein, can communicate with one or more other computing devices over any combination of one or more types of wireless or wired networks (e.g., the Internet, a wide area network, a local area network, a virtual private network, etc.).

In embodiments, the mobile computing device 10 includes a power management component 12. As described in more detail herein, the power management component 12 receives data from one or more sensors and/or timers and uses this data to make decisions on the power savings associated with one or more antennas. In alternate or additional embodiments, the power management component 12 receives data from one or more sensors and/or timers and uses this data to make decisions on other power savings associated with one or more other functionality of the mobile computing device 10, e.g., disabling certain functionality or applications on the mobile computing device. These functionalities or applications can be, for example, tracking activities using GPS, etc. In embodiments, the power management component 12 can be integrated into any number of different mobile computing devices.

The power management component 12 can be embodied as a system, method or computer program product in order to perform or implement the processes described herein. Accordingly, aspects described herein may take the form of an entirely hardware embodiment, an entirely software embodiment (including firmware, resident software, microcode, etc.) or an embodiment combining software and hardware aspects that may all generally be referred to herein as a "circuit," "module" or "system."

The computer program product can be embodied in one or more computer readable medium(s) having computer readable program code embodied thereon. The computer program product may include a computer readable storage medium (or media) having computer readable program instructions thereon for causing a processor to carry out aspects of the present disclosure. The computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Instead, the computer readable storage medium may be, for example, but is not limited to, a tangible device, e.g., an electronic storage device, a magnetic storage device, an optical storage device, an electromagnetic storage device, a semiconductor storage device, or any suitable combination of the foregoing.

The mobile computing device 10 includes, e.g., a processor (e.g., CPU), memory, an I/O interface, and a bus. The memory can include local memory employed during actual execution of program code, bulk storage, and cache memories which provide temporary storage of at least some program code in order to reduce the number of times code must be retrieved from bulk storage during execution. The I/O interface can comprise any interface that enables an individual to interact with the mobile computing device 10 (e.g., user interface screen, keyboard, etc.). In addition, the mobile computing device 10 can include random access memory (RAM), a read-only memory (ROM), and an operating system (O/S). In general, the processor executes computer program code (e.g., program control), which can be stored in memory and/or storage system, and which executes the processes described herein as implemented/configured/embodied by the power management component 12. While executing the computer program code, the processor can read and/or write data to/from memory, storage system, and/or I/O interface.

Referring still to FIG. 1, the mobile computing device 10 can include one or more antennas 14. These antennas 14 include, but are not limited to, WiFi, 2G, 3G, 4G, 5G, and Bluetooth, etc. The mobile computing device 10 further includes sensors, timers and other functionality as shown generally at reference numeral 16. In embodiments, the sensors and other functionality 16 can include, but are not limited to, accelerometers, gyroscopes, cameras, temperature sensors, touch screen, keyboard, mobile computing device buttons, device activity, clocks, etc. Other sensors can include, for example, pedometers and ambient light sensors.

Multiple timers are also used, including but not limited to: a retry timer that is used to wake-up the associated antenna at a pre-set interval and check for a signal independent of sensor activity, and a signal-interrupt timer that defines the duration that the mobile computing device continues to search for signal when signal is not available. By using the timers in conjunction with the sensors and/or other activity of the device, once a threshold is exceeded, e.g., after a predetermined period of inactivity of the mobile computing device as sensed by any of the sensors or inactivity of functions of the mobile computing device 10, the power management component 12 can force one or more antennas 14 or other functionality/applications into a low power state. For example, the power management component 12 can shut off the camera or place other external activity in a power savings mode. After a second predetermined time period as determined by the retry timer, the power to the antenna(s) 14 (or other functionality or applications) of the mobile computing device 10 can be restored, e.g., to begin a searching for services.

Accordingly, in embodiments, the power management component 12 has the ability to control antennas 14 and their associated circuitry based on environmental changes as detected by one or more sensors, functionality etc. 16, where environmental changes include but are not limited to location of device, distance traveled by device, acceleration of device, temperature of device, etc. By way of more specific example, the power management component 12 can periodically communicate with one or more sensors, etc. 16 to decide whether to configure a specific antenna to maintain a fully powered state or enter into a reduced power state that could include a full power-down of the antenna based on an activity of the mobile computing device 10 and a predetermined time period. In case of emergency, a quick override will return the mobile computing device 10 into a fully powered state with conventional antenna power management.

By way of even more specific examples, by monitoring the motion (e.g., acceleration) of the mobile computing device 10, using the accelerometers and/or gyroscope, the power management component 12 can place the mobile computing device 10 into a power savings mode when no motion has been detected for a predetermined period of time. Once a motion is sensed, the mobile computing device 10 can then be placed in an active mode, e.g., fully powered state of an application, antenna, or other functionality of the mobile computing device 10.

Figure 2:
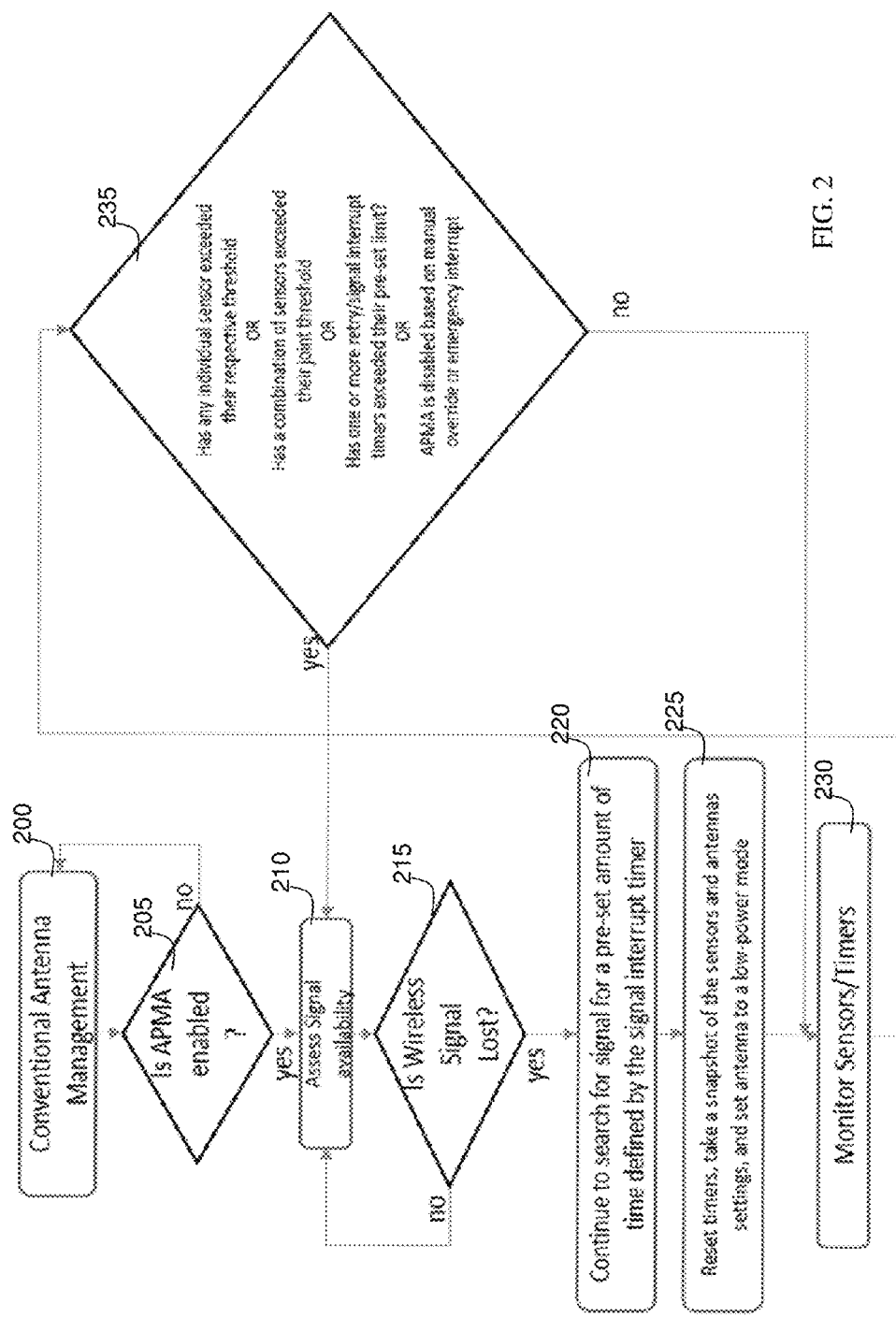
FIGS. 2-3 are exemplary flow diagrams showing exemplary processes in accordance with aspects of the disclosure.
Figure 3:
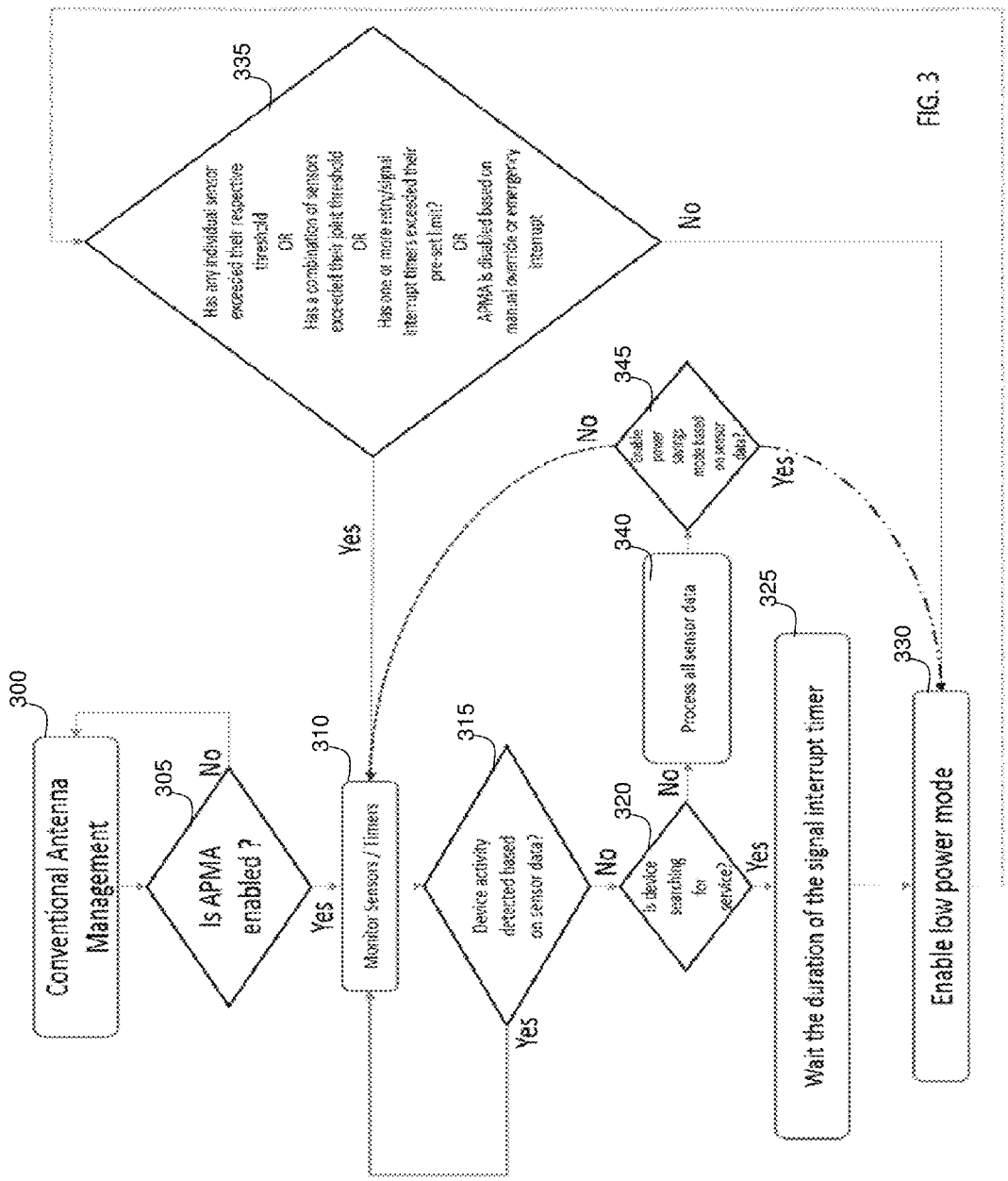

FIGS. 2-3 are exemplary flow diagrams in accordance with aspects of the disclosure. The steps of FIG. 2-3 may be implemented in the environment of FIG. 1, for example. It should further be understood that the flowchart(s) illustrate the architecture, functionality, and operation of possible implementations of systems, methods, and computer program products according to various embodiments of the present disclosure.

More specifically, FIG. 2 describes a process used by the power management component to control whether a specific antenna remains in a fully powered state or enters a reduced power state. For example, if the power management component is enabled (also referred to as an antenna power management application (APMA)), the mobile computing device would start by assessing signal availability for each antenna, and if signal is not available it will initiate the sequence necessary to place the antenna into a reduced power state. The sequence necessary to enter a reduced power state for the antenna could comprise, but it is not limited to:

(i) a collection of sensor data to be used as a baseline for future power management component decisions;

(ii) entering reduced power state of the antenna and/or its associated circuitry;

(iii) resetting the retry timer that is used to power-up the antenna at a pre-set time interval and check for signal regardless of sensor activity; and (iv) start the monitoring of all sensors to decide whether any of them have exceeded their pre-set thresholds necessary to initiate the transition into a fully powered state of the antenna and start searching for signal.

In embodiments, the power management component will continue to monitor the mobile computing device sensors and timers and use the associated data to decide when to bring the respective antenna into fully powered state. The decision to bring up the antenna to full power state might include a single sensor exceeding its pre-set sensor threshold or it might include multiple sensors exceeding individual or joint pre-set thresholds. In addition to sensors the power management component could bring the associated antenna to a fully powered state if a specific retry timer or any other timer has exceeded their own respective threshold. Alternatively, the power management component could also be manually disabled in case of an emergency through an emergency interrupt.

In particular, in FIG. 2, at step 200, the mobile computing device is in an "on" state and initially is set to a conventional antenna management mode. At step 205, a determination is made as to whether an antenna power management application (APMA), as initiated and enabled by the power management component, is activated. If not activated, the processes return to step 200. If the antenna power management application is activated, e.g., turned on, the processes continue to step 210.

At step 210, the processes assess whether a signal is available. At this step, the antenna is powered up and is in a "searching for service" mode. If the signal is available, the processes continue to step 215 where a determination is made as to whether a wireless signal has been lost. If the wireless signal has not been lost, the processes will revert to step 210.

If a wireless signal is lost, at step 220, the processes will continue to search for a signal for a preset amount of time, e.g., 30 seconds, as defined by a signal-interrupt timer. At step 225, the timers are reset and a snapshot of the sensors and antenna settings are taken. If the snapshot of the sensors determines that there is no activity related to the mobile computing device, e.g., no movement, etc., for a predetermined amount of time (as noted by the timers), the antenna is set to a low power setting.

At step 230, the processes will begin to monitor the sensors and timers. It should be understood by those of skill in the art that other functionality of the mobile computing device can also be monitored such as, e.g., keystrokes, taps on the screen, etc. At step 235, a determination will be made as to whether the antenna setting should be placed in "searching for signal" mode, e.g., the processes should advance to step 210. By way of illustrative non-limiting example, the processes described herein will determine whether, amongst other things contemplated herein:

(i) A sensor exceeded its threshold;

(ii) A combination of sensors exceeded their joint threshold;

(iii) One or more retry/signal-interrupt timers exceeded a preset limit; and/or (iv) The antenna power management component has been disabled based on a manual override or emergency interrupt.

If the answer is yes to any of the above (i)-(iv), the processes will proceed to step 210. Accordingly, if the answer is yes to any of the above, the processes will assess signal availability. In other words, if any of the above thresholds have been exceeded or if there is an emergency interrupt or manual override detected, the processes will enable the antenna of the mobile computing device, e.g., power up the antenna, in order to search for a service (signal).

In embodiments, the threshold of the sensors can be preset by the user or can be a factory default setting. By way of example, when an accelerometer exceeds a certain threshold (in $m/s^2$) in the x-direction, y-direction and/or the z-direction, the antenna of the mobile computing device can be placed in a search for a service (signal) mode for a predetermined period of time, e.g., 30 seconds. After a certain predetermined period of time after the sensor (e.g., accelerometer) data falls below the preset threshold and/or no signal is detected, the mobile computing device can then be placed in a power savings mode.

FIG. 3 shows another embodiment where the mobile computing device uses a signal-interrupt timer that defines the duration of signal search once the antenna is brought to a fully powered state while searching for signal. One use of this timer is to prevent the mobile computing device antenna from entering a reduced power state during a short duration signal-interruption. Another use of this timer is to allow the device to adjust to a new environment (e.g., temperature difference from a cold car to a warm office) before making a decision to move the antenna into a reduced power state.

In particular, in FIG. 3, at step 300, the mobile computing device is in an "on" state and initially is set to a conventional antenna management mode. At step 305, a determination is made as to whether the antenna power management application, as initiated and enabled by the power management component, is activated. If not activated, the processes return to step 300. If the antenna power management application is activated, e.g., turned on, the processes continue to step 310.

At step 310, the processes monitors the sensors and/or timers of the mobile computing device. As noted previously, the processes can also monitor other activity or functionality of the mobile computing device. At step 315, a determination is made as to whether there is device activity based on sensor data. If device activity is sensed or determined, the processes will revert back to step 310. If no device activity is sensed or determined, the processes will continue to step 320.

At step 320, a determination is made as to whether the device is searching for a signal. If the processes are searching for a signal, the processes will continue to step 325, where the antenna power management application, as initiated and enabled by the power management component, will wait a predetermined amount of time, e.g., the duration of the signal-interrupt timer. At step 330, after the predetermined amount of time, the processes will enable a low power mode of the mobile computing device. For example, the antenna can be powered down, e.g., deactivate the "searching for service" mode.

At step 335, a determination will be made as to whether the mobile computing device should be placed in a low power mode or be powered up, e.g., antenna setting should be placed in "searching for signal" mode. By way of illustrative non-limiting example, the processes described herein will determine whether, amongst other things contemplated herein:

(i) A sensor exceeded its threshold;
(ii) A combination of sensors exceeded their joint threshold;
(iii) One or more retry/signal-interrupt times exceeded a preset limit; and/or
(iv) The antenna power management application has been disabled based on a manual override or emergency interrupt.

If the answer is yes to any of the above (i)-(iv), the processes will proceed to step 310 at which stage the processes will assess signal availability. Accordingly, if the answer is yes to any of the above, the processes will power up the antenna as described herein.

If, at step 320, services are not being searched, the processes will continue to step 340. At step 340, all of the sensor data can be processed, e.g., monitored and compared against threshold data. At step 345, a determination is made as to whether the power savings mode is enabled based on sensor data. If not enabled, the processes will revert back to step 310. If enabled, the processes will continue to step 330.

Figure 4:
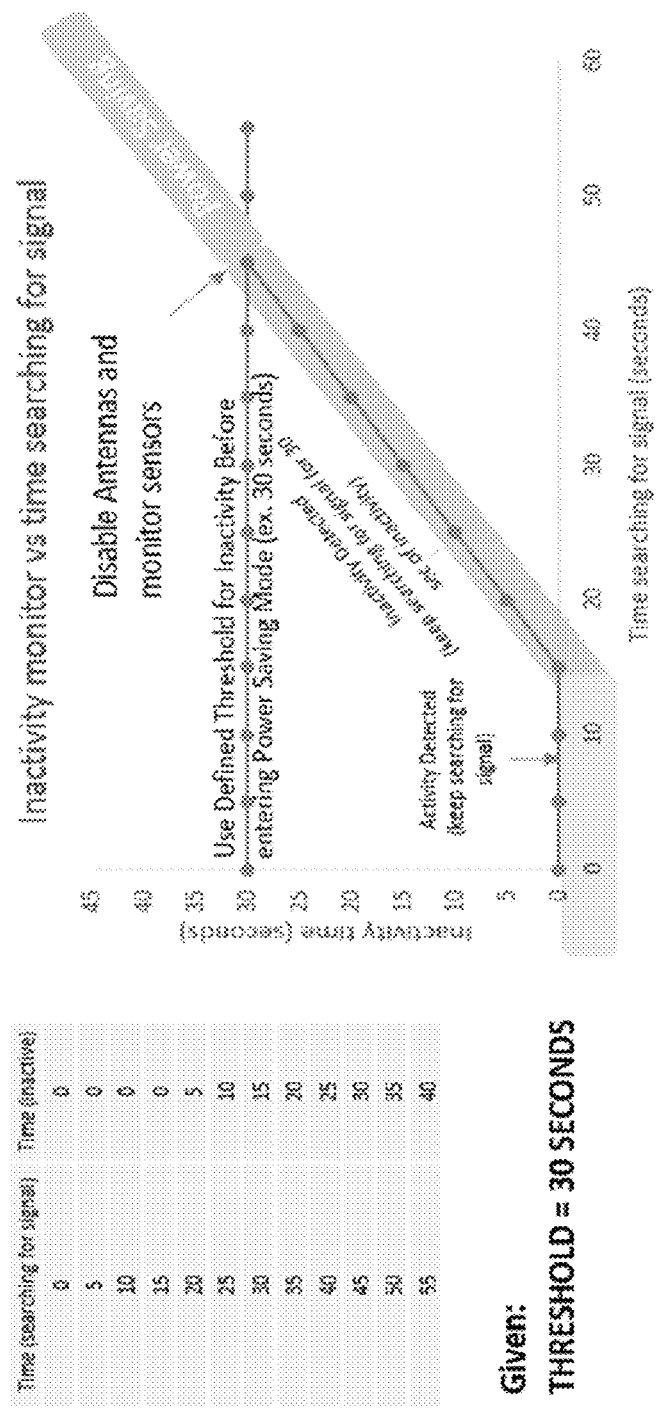
FIG. 4 shows an illustrative example of a mobile computing device using a signal-interrupt timer to continue to search for signals in accordance with aspects of the disclosure.

FIG. 4 shows an illustrative example of a mobile computing device using a signal-interrupt timer to continue to search for signals in accordance with aspects of the disclosure. More specifically, FIG. 4 shows an example where a mobile computing device uses a signal-interrupt timer to continue to search for signals for 30 seconds (or other predetermined period of time) after the antenna was brought up to a fully powered state by device activity. For example, after the pre-set signal-interrupt timing threshold is crossed (e.g., 30 seconds) and no device activity has been detected, the device enters a reduced power state, e.g., at time 45 seconds.

In embodiments, the power management component for the mobile computing device uses changes in the device activity to decide whether the search for wireless signal should continue, consuming the power associated with searching for signal, or to use the input from one or more device sensors to discontinue the search for signal, and reduce the associated power consumption. The "device activity" can be any environmental changes as measured by one or more sensors, e.g., pedometer, accelerometer, ambient light sensors, gyroscope information, and/or one or more timers. Accordingly, by using this process, the mobile computing device can reduce its power of specific antennas by avoiding the continued search for signal in a geographic area where the mobile computing device has previously assessed that no signal is available. Alternatively, by using this process, the mobile computing device can reduce its power of applications or functions by powering down the device.

On the other hand, once the mobile computing device starts moving (as detected by accelerometer, gyroscopes, etc.) and covers a distance threshold, the antennas could be re-enabled and another search for signal can be executed in now a different geographic area that might have a signal. This process of activating and deactivating the associated antenna described above can be done repeatedly throughout the lifetime of the device provided the criteria based on the user programmable sensor thresholds are satisfied.

In addition to simple distance-based decision to resume search for signal, a more advanced location based decision could also be used by the power management component to decide whether the device is entering a location that was previously assessed to have signal or not. For example, FIG. 5 shows an example illustration of implementing the processes described herein based on signal availability and location, in accordance with aspects of the present disclosure.

Figure 5:
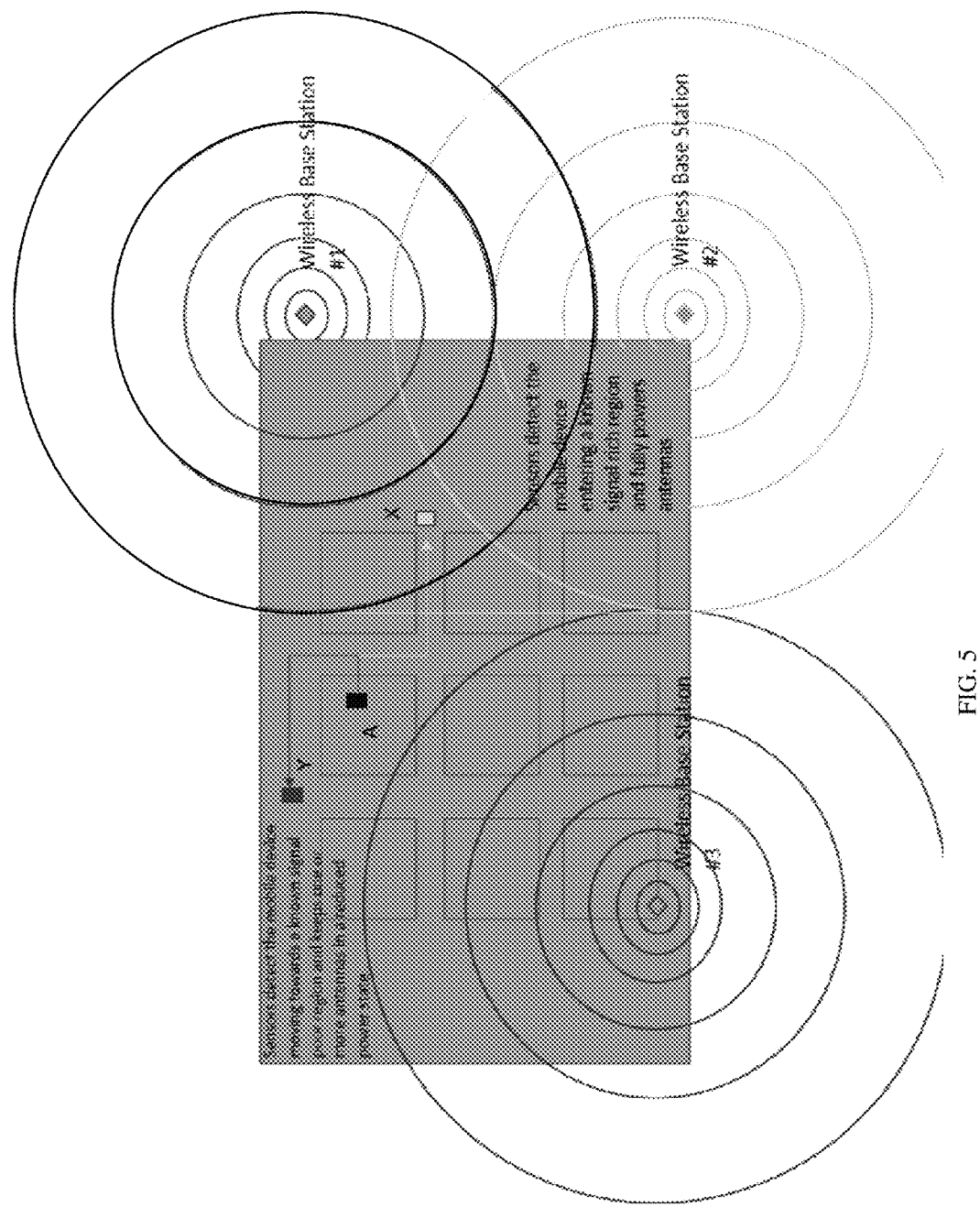
FIG. 5 shows an illustrative example of a mobile computing device using signal availability and device location for power savings in accordance with aspects of the present disclosure.

More specifically, FIG. 5 shows an example where a device shown with a box "A" moves in one of two directions, shown by arrows, that cause it to end up in one of two possible locations, shown with the boxes labeled "X" and "Y". In the simple distance based decision, the search for signal will resume in both cases assuming that the mobile computing device has crossed the distance threshold. In the location based decision, the mobile computing device will not only assess the distance traveled, but it will also use a pre-stored map of signal availability to decide whether to bring the antenna into a fully power state or keep it in a reduced power state. The pre-stored map could contain signal data for all types of antennas, and could be constantly updated with wireless provider signal coverage maps or previous device signal availability history. The pre-stored map could be used with GPS information, or in a lower-power mode it could be used with a combination of previously established GPS location along with accelerometer, pedometer, and/or other sensors that could help determine the approximate location of the device without re-enabling the GPS.

Alternatively, in the case where the mobile computing device does not have an accelerometer or gyroscope but it does have antennas connected to wireless networks, the device could determine its location by using multiple wireless network signal strengths and their location. As the wireless strength increases or decreases, for example, the mobile computing device could determine if it is getting closer or farther from the wireless source. By calculating the distance from various wireless sources, the mobile computing device could establish an approximate location, which can then be used to control other wireless antennas. Additionally, the user will have to option to completely disable this power savings method for automatically enabling or disabling the power management component. Further, in attempts to make emergency contacts or phone calls the mobile computing device will restore all previous settings and search for a signal immediately.

To account for long-duration signal-interruption (i.e., cell phone service is brought down from a storm) the retry timer can be used to reactivate the search for signal after a pre-set amount of time even if the device remains in an area that has been initially assessed to be without signal. The power management component waits the duration of the retry timer threshold before it restores antenna(s) to their previous settings and resumes the searching for signal. If signal is found because the cell phone service was restored, the device antenna continues to operate in a fully powered state. However, if no signal is found the power management component repeats the power savings process as already described herein.

In another example, the user could also utilize one or more other sensors to determine whether to activate the power management component based on what activities are taking place on the mobile computing device (e.g., functionality such as music streaming, text messaging, etc.) or what peripherals are connected to the device. For example, if a user has the mobile computing device connected via Bluetooth to speakers to stream music or connected to a Bluetooth enabled I/O device (keyboard, mouse, etc.) then the user could decide whether or not the mobile computing device should enable the power management component even if it is searching for signal and the mobile computing device is otherwise inactive as determined by one or more other sensors. In another example, the use of the internal temperature sensor can be used to enable or disable the power management component.

Moreover, mobile computing devices searching for signal are often operating at higher temperatures due to excessive power consumption not normally experienced. Previously, there was not much the user could do to prevent their mobile computing device from getting excessively hot except not use the device, enter airplane mode manually or move to a colder environment. By enabling the power management component when the user's mobile computing device exceeds a user programmable temperature threshold, it is also possible to reduce power consumption while the user is not using the mobile computing device and it is simply searching for signal. Excessively high temperatures can damage both the battery and internal electronics from prolonged exposure, reducing the lifetime of the device even when the user is not using their device for any purpose other than having the device on them in, for example, an office setting without wireless connections available to the user. Once the mobile computing device reduces its temperature to a normal safe operating level, the mobile computing device can restore all previous settings and exit the automatically enabled power management component.

In another example using light sensors, camera data and other sensors along with an internal timer, the user could enable the mobile computing device to automatically enable power management component during off peak hours when the user is unlikely to use the mobile computing device. The user can set the time to enable power management component to an off peak hour such as midnight (12 AM) and if the device does not detect any light, and the user is inactive the phone should enable power management component to save power while the user is sleeping. If the user wakes up in the middle of the night and turns on the light the signal search can be re-enabled. An added benefit is the user is not disturbed through the night by their mobile computing device via ringing or notifications from unexpected SMS or phone calls. In embodiments, alarms would be unaffected by enabling power management component and could be used as the trigger to restore all previous settings such as searching for signal and receiving messages or calls.

In further embodiments, the methods for enabling power management component automatically for a mobile computing device based on user programmable thresholds can be used separately, or in conjunction with each other to provide immense power savings throughout the day as demonstrated. The benefits of this include but are not limited to: longer battery life of the mobile computing device throughout the day, long term battery life so that fewer replacement batteries will be required for the lifetime of the device by reducing the number of required charge cycles.

By way of comparison, the battery drainage of the mobile computing device can be considerably reduced by implementing aspects of the disclosure described herein. Specifically, experiments have shown that there is an approximately 0.0083% drainage of battery per minute in airplane mode vs. 0.025% drainage of the battery per minute under normal operation vs. 0.075% drainage of the battery per minute continuously searching for service. In fact, as shown by experiment in FIG. 6, placing the mobile computing device in airplane mode, e.g., deactivating the "searching for signal" mode, achieves considerable battery life savings over a 240 minute span of time.

Figure 6:
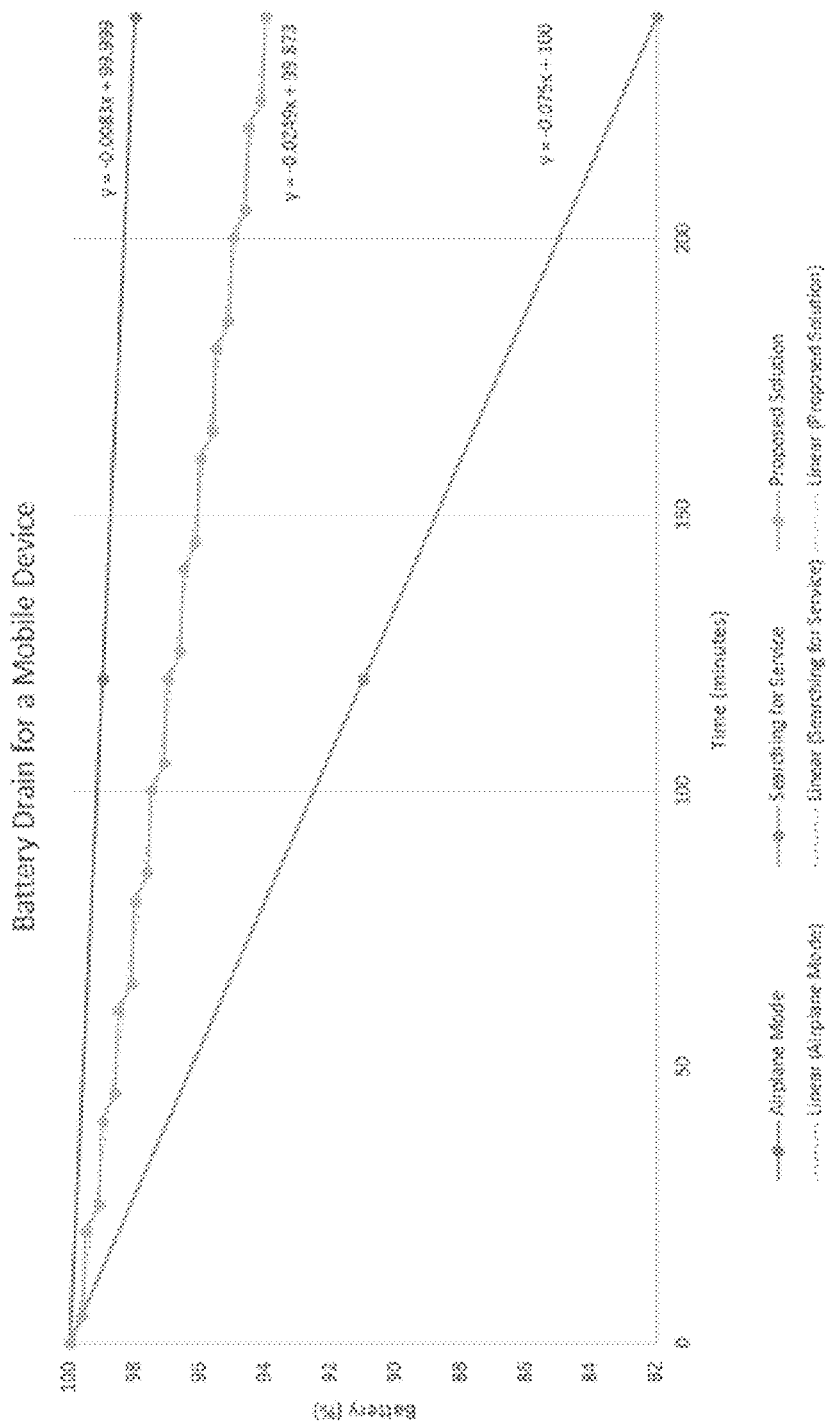
FIG. 6 shows a graph of battery drain over time in three different modes in accordance with aspects of the present disclosure.

More specifically, FIG. 6 shows a graph of battery drain over time in three different modes. In FIG. 6, the x-axis is time in minutes and the y-axis is battery percentage. The three different modes include: airplane mode, searching for service and the proposed solution as described in the present disclosure. The experiment included the following conditions:

The mobile computing device was operating in an area without service so that the mobile computing device would be continuously searching for service.

The battery of the mobile computing device was initially charged to 100% at time t=0 minutes.

After 5 minutes of searching for service, the mobile computing device was manually placed into airplane mode for 15 minutes, noting the battery life at the end of each time interval.

After 15 minutes of airplane mode, the airplane mode was disabled allowing the mobile computing device to searching for service for an additional 5 minutes.

After this 5 minute interval, the airplane mode was manually enabled for 15 minutes.

This experiment continued by switching between searching for service and airplane mode for four hours (240 minutes).

Additional experimental results show that a mobile computing device searching for service and not being used for a period of approximately 48 minutes experiences a battery drain of approximately 10%. Results also show that the same mobile computing device not searching for service for a period of approximately 64 minutes experiences a battery drain of only approximately 2%.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented in a computer infrastructure having computer executable code tangibly embodied on a computer readable storage medium having programming instructions operable to:
   place a mobile computing device into a power savings mode which deactivates a search for a signal mode without monitoring battery life when an environmental condition is below a sensor threshold value for a predetermined time period;
   place the mobile computing device into a powered up state when the environmental condition exceeds the sensor threshold value;
   restore all previous settings of the mobile computing device in response to an attempt of a phone call;
   determine that the mobile computing device, which is placing the antenna into a reduced power state, is entering a location that was previously assessed to have a signal or not; and
   use a pre-stored map of signal availability to decide whether to bring the antenna into a fully power state or keep it in the reduced power state,
   wherein the pre-stored map contains signal data for all types of antennas, and is updated with wireless provider signal coverage maps or previous device signal availability history.

2. The method of claim 1, wherein the environmental condition includes one of movement of the mobile computing device, location of mobile computing device, distance traveled by the mobile computing device, acceleration of the mobile computing device and temperature of the mobile computing device.

3. The method of claim 2, wherein the power savings mode is a powering down of one or more antennas of the mobile computing device.

4. The method of claim 1, wherein the environmental condition is sensed by one or more sensors of the mobile computing device and the predetermined time period is determined by a timer of the mobile computing device.

5. The method of claim 1, wherein the environmental condition is a location of the mobile computing device such that when the mobile computing device is determined to be outside of a service area, the mobile computing device is placed into the power savings mode by suspending or delaying a searching for signal mode.

6. The method of claim 1, wherein a retry timer is used to wake-up an antenna of the mobile computing device at a pre-set interval and check for a signal independent of sensor activity, and a signal-interrupt timer defines a duration that the mobile computing device continues to search for signal when a signal is not available.

7. The method of claim 6, wherein the mobile computing device uses a signal-interrupt timer to continue to search for signals for a predetermined period of time after an antenna was brought up to a powered state by device activity.

8. The method of claim 6, wherein the antenna is re-enabled to search for signal when the mobile computing device starts moving and covers a distance threshold.

9. The method of claim 1, wherein the mobile computing device senses its temperature and places itself into the power savings mode until a temperature is sensed to be at a safe operating level.

10. A computer program product comprising a computer readable storage medium having program instructions embodied therewith, the program instructions being executable by a mobile computing device to cause the mobile computing device to control whether a specific antenna remains in a fully powered state or enters a reduced power state comprising:
    determining that a signal has been lost and searching for the signal for a preset amount of me;
    monitoring one or more sensors of the mobile computing device to determine that any of the sensors have exceeded their pre-set thresholds;
    placing the antenna into a low power setting mode when the sensors indicate that there is no activity related to the mobile computing device for a predetermined amount of time;
    placing the mobile computing device into a power savings mode when the one or more sensors remain below their pre-set thresholds;
    restoring all previous settings of the mobile computing device and searching for the signal in response to an attempt of a phone call; and
    collecting sensor data to be used as a baseline for future power management component decisions and resetting a retry timer at a pre-set time interval and checking for a signal regardless of sensor activity.

11. The computer program product of claim 10, further comprising initiating a transition into a fully powered state of the antenna and start searching for a signal when one or more of the sensors of the mobile computing device have exceeded their pre-set thresholds.

12. The computer program product of claim 10, further comprising bringing the antenna to the fully powered state when a retry timer has exceeded its predetermined threshold.

13. The computer program product of claim 10, further comprising:
    activating an antenna power management application of the mobile computing device;
    assessing that a signal is available and powering up the antenna into a searching for service mode;
    resetting one or more timers and taking a snapshot of the one or more sensors and antenna settings;
    placing the antenna into the low power setting mode when the snapshot of the sensors indicates that there is no activity related to the mobile computing device for the predetermined amount of time; and
    powering up the antenna into the searching for service mode when it is determined that the one or more sensors exceed their pre-set thresholds.

14. A system comprising:
    a central processing unit (CPU), a computer readable memory and a computer readable storage medium;
    program instructions to define a duration of signal search once an antenna of a mobile computing device is brought to a fully powered state while searching for the signal;
    program instructions to prevent the antenna of the mobile computing device from entering a reduced power state during a short duration signal-interruption;
    program instructions to determine a location of the mobile computing device by using multiple wireless network signal strengths and their location;
    program instructions to allow the mobile computing device to adjust to a new environment before making a decision to move the antenna into a reduced power state;
    program instructions to allow the mobile computing device to override the reduced power state and return to the fully powered state;

program instructions to monitor one or more sensors and timers of the mobile computing device and determine that there is device activity based on sensor data; and program instructions to enable a low power mode after the device has been searching for the signal for a predetermined amount of time without success and when the sensor data has exceeded a predetermined threshold, wherein the program instructions are stored on the computer readable storage medium and are executed by the CPU via the computer readable memory.

\* \* \* \* \*